Dec. 19, 1939.   C. E. JOHNSON   2,183,887
VARIABLE-SPEED PULLEY STRUCTURE
Original Filed May 1, 1933

INVENTOR
CARL E. JOHNSON
BY HARRIS, KIECH, FOSTER & HARRIS

ATTORNEYS.

Patented Dec. 19, 1939

2,183,887

UNITED STATES PATENT OFFICE 2,183,887

VARIABLE-SPEED PULLEY STRUCTURE

Carl E. Johnson, Pasadena, Calif.

Original application May 1, 1933, Serial No. 668,772. Divided and this application December 7, 1937, Serial No. 178,469

1 Claim. (Cl. 74—230.17)

This application is a division of my copending application, Serial No. 668,772, filed May 1, 1933, for "Variable-speed power device".

My invention relates in general to power devices adapted to drive machinery at variable speeds, and relates particularly to power devices having variable-diameter belt and pulley transmission means.

The objects of my present invention are in general to provide in variable-speed power devices having one or more variable-diameter pulleys simple means whereby the variable-diameter pulley or pulleys may be quickly and positively adjusted to produce a desired speed of a power output or power delivery shaft which is adapted to be connected to a power utilizing device in accordance with the known practices of couplings, gearings, or belting; and to produce certain important improvements in the construction of variable-speed power devices as hereinafter set forth.

A further object of the invention is to provide a power device which employs a spring-adjusted V-type pulley and is provided with means for moving a movable pulley flange thereof axially in accordance with belt tension changes.

It is a further object of the invention to provide a new and improved V-belt pulley structure which may be mounted on a motor shaft and which will require a minimum of space outside the motor structure.

A further object of the invention is to provide a novel and valuable spring-adjusted variable-diameter V-type pulley having minimum space requirements when mounted on a motor shaft.

It is a further object of the invention to provide an electric motor having a hollow drive shaft with a variable-diameter V-type pulley mounted thereon, there being a spring within the drive shaft and operable to hold one of the flanges of the pulley in movable relation relative to the other.

Further objects and advantages of the invention will be made evident throughout the following specification.

Referring to the drawing, which is for illustrative purposes only,

Figure 1:
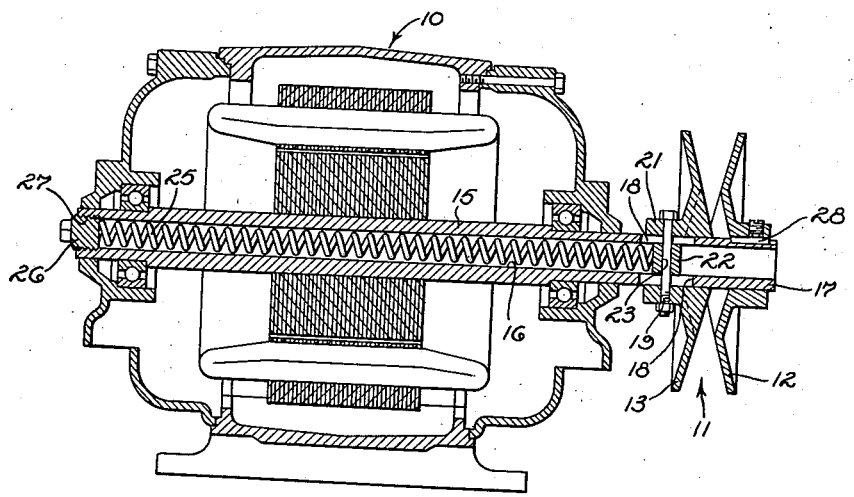
Fig. 1 is a longitudinally, vertically sectioned view showing a form of my spring-operated variable-diameter pulley applied to a motor.

In Fig. 1, I show a motor 10 equipped with a variable-diameter V-type pulley 11 having a fixed outer flange 12 and an axially movable inner flange 13. In this form of the invention the motor 10 is provided with a tubular or hollow shaft 15 having an opening 16 extending from end to end thereof. In the projecting end 17 of the tubular shaft 15, near the rightward end of the motor 10, longitudinal, diametrally opposed slots 18 are placed, through which a diametral pin 19 may be extended so as to engage a hub 21 formed on the axially movable flange 13. Within the axial opening 16 of the shaft 15, a sliding block 22 of cylindrical form is placed, this block having a diametral opening 23 through which the pin 19 passes.

Figure 2:
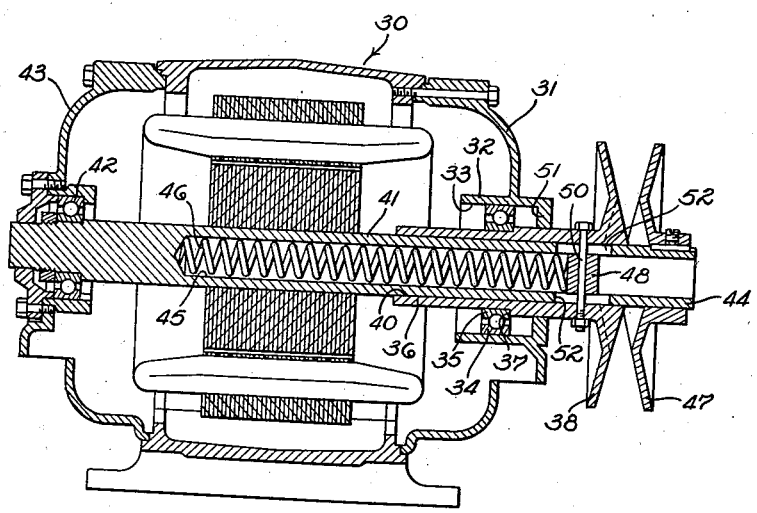
Fig. 2 is a longitudinally, vertically sectioned view showing an alternative form of my spring-operated variable-diameter pulley applied to a motor.

A helical spring 25 is placed in the axial opening 16 in a position between the sliding block 22 and a threaded plug 26 adapted to screw into threads 27 formed within the leftward end of the shaft 15. The force with which the spring 25 bears rightwardly against the block 22 may be varied by screwing the plug 26 in or out of the threads 27 formed in the leftward end of the opening 16. The force of the spring 25 yieldably urges the axially movable flange 13 toward the fixed flange 12 which may be firmly secured on the extreme rightward end of the shaft 15 by use of any desired means. For this purpose, I have shown key means 28 for preventing rotation of the flange 12 relative to the shaft 15. Relative rotation of the flange 13 is prevented by reason of the engagement of the diametral pin or bolt 19 with the side walls of the diametral slots 18 formed in the wall of the shaft 15. The pulley 11 has its effective diameter varied by the action of a belt between the flanges 12 and 13, as is well known in the art.

Where an exceptionally rugged pulley structure is desired, or where it may be required to dispose the pulley in closer relation to the ends of the motor, I vary the form of the invention shown in Fig. 1 in the manner shown in Fig. 2, in which a motor 30 is provided with an end bell or member 31 having a cylindrical wall 32 set axially therein, this wall 32 having a smooth bore 33 in which the outer race of a ball bearing 34 may slide axially. The inner race 35 of the bearing 34 is mounted on an axial sleeve 36 in a position to rest against a shoulder 37 formed on such sleeve 36. The sleeve 36 forms an extended hub of an axially movable flange 38, and the sleeve 36 has a bore 40 which slidably fits a motor shaft 41, the leftward end of which motor shaft is carried in a bearing 42 secured in the leftward end bell 43 of the motor 30. In the assembly of parts shown, the sleeve 36 operates with or forms a slidable part upon the rightward portion of the shaft 41, and the support of the rightward end of the shaft 41 is accomplished through engagement of the sleeve 36 with the ball bearing 34. The rightward end 44 of the shaft 41 projects from the flange 38, and a fixed flange 47 is secured thereon. The rightward portion of the shaft 41 is counterbored so as to provide an axial opening 45 therein to accommodate a spring 46 having the function of forcing rightwardly against a slide block 48 through which a diametral bolt or pin 50 extends. Between the end wall 51 of the cylindrical wall 32 and the flange 38, the end of the diametral pin 50 engages the sleeve 36, and longitudinal slots 52 are formed in the shaft 41 in diametrally opposed position, through which slots 52 the pin 50 passes and in which slots the pin 50 is axially movable relative to the shaft 41. In this form of the invention, the movement of the flange 38, due to the combined actions of the spring 46 and the belt which may be employed in the V-slot of the pulley, correspondingly moves the sleeve 36 so as to bodily move the bearing 34 in the bore 33 of the cylindrical wall 32. The shaft structure in this manner produced is very rigid, and by following this design the variable-diameter pulley may be placed close to the end of the motor so that space requirements for the pulley beyond the end of the motor will be maintained at a minimum.

Although I have shown and described my invention in simple and practical form, it is recognized that certain parts or elements thereof are representative of other parts, elements, or mechanisms which may be used in substantially the same manner to accomplish substantially the same results; therefore, it is to be understood that the invention is not to be limited to the details disclosed herein but is to be accorded the full scope of the following claim.

I claim as my invention:

A variable-speed pulley structure of the character described, including: a motor; a motor shaft having an end extending from said motor, said shaft having a central opening therein and a longitudinal slot communicating with said opening; a V-type pulley on said end of said shaft, said pulley comprising a fixed flange rigidly secured to said shaft and a movable flange axially movable on said shaft; means connected to said movable flange and extending through said slot into said opening; a spring member within said opening in said shaft for exerting a force on said means tending to move said movable flange axially relative to said fixed flange; a movable hub connected to said movable flange and journalling said end of said drive shaft; a bearing fixed to said hub and movable therewith, said bearing sliding in a tubular flange secured to said motor, said bearing providing a radial bearing support for said hub; and bearing means associated with said motor for supporting the other end of said motor shaft.

CARL E. JOHNSON.